(12) United States Patent
Jüptner

(10) Patent No.: US 8,573,342 B2
(45) Date of Patent: Nov. 5, 2013

(54) HARVESTING MACHINE AND SCREEN ARRANGEMENT

(75) Inventor: Detlef Jüptner, Kleinblittersdorf (DE)

(73) Assignee: Deere & Company, Moline, IL (US)

( * ) Notice: Subject to any disclaimer, the term of this patent is extended or adjusted under 35 U.S.C. 154(b) by 926 days.

(21) Appl. No.: 12/512,208

(22) Filed: Jul. 30, 2009

(65) Prior Publication Data

US 2010/0024747 A1 Feb. 4, 2010

(30) Foreign Application Priority Data

Jul. 31, 2008 (DE) .......................... 10 2008 040 902

(51) Int. Cl.
*B60K 11/00* (2006.01)

(52) U.S. Cl.
USPC ........................................ 180/68.1; 180/68.6

(58) Field of Classification Search
USPC ............................. 280/68.1–68.4, 68.6, 309; 180/68.1–68.4, 68.6, 291, 296
See application file for complete search history.

(56) References Cited

U.S. PATENT DOCUMENTS

| | | | | |
|---|---|---|---|---|
| 3,636,684 | A * | 1/1972 | Vogelaar et al. | 56/14.7 |
| 3,786,891 | A * | 1/1974 | Vogelaar et al. | 180/68.4 |
| 3,837,149 | A * | 9/1974 | West et al. | 55/282.5 |
| 4,100,965 | A * | 7/1978 | Kolinger et al. | 165/119 |
| 4,439,218 | A * | 3/1984 | Priepke et al. | 55/288 |
| 4,542,785 | A * | 9/1985 | Bagnall et al. | 165/95 |
| 5,785,139 | A * | 7/1998 | Freedy et al. | 180/68.1 |
| 6,029,430 | A * | 2/2000 | Isfort et al. | 56/12.8 |
| 6,248,145 | B1 * | 6/2001 | Radke | 55/295 |
| 6,302,066 | B1 * | 10/2001 | Steinmann | 123/41.49 |
| 7,134,518 | B2 * | 11/2006 | Arai et al. | 180/68.1 |
| 7,997,238 | B2 * | 8/2011 | D'Hondt et al. | 123/41.31 |
| 2006/0037565 | A1 | 2/2006 | Coates | |
| 2008/0257531 | A1 * | 10/2008 | D'hondt et al. | 165/104.34 |

FOREIGN PATENT DOCUMENTS

| | | |
|---|---|---|
| DE | 19547348 | 7/1997 |
| DE | 197 42 846 | 4/1999 |
| DE | 10126523 | 12/2002 |
| DE | 10228213 | 2/2004 |
| EP | 0481203 | 9/1991 |
| EP | 0667447 | 1/1995 |
| RU | 2 044 445 | 9/1995 |
| SU | 1014509 | 4/1983 |
| SU | 1042658 | 9/1983 |
| WO | 01/36794 | 5/2001 |
| WO | 0136794 | 5/2001 |

OTHER PUBLICATIONS

SearchReport, 6 Pages.
Eurasian Search Report, 4 Pages, Dec. 3, 2009.

* cited by examiner

*Primary Examiner* — J. Allen Shriver, II
*Assistant Examiner* — Travis Coolman

(57) ABSTRACT

A harvesting machine is provided with a chassis, that includes at its rear an enclosed engine compartment in which an internal combustion engine is arranged. A screen arrangement can be positioned at the forward side of the engine compartment that includes a perforated filter element through which a blower can draw air through it and to the rear into the engine compartment. The screen arrangement is arranged to slide in a direction extending horizontally and transverse to the forward operating direction of the harvesting machine between an operating position of the engine compartment and a maintenance position outside the engine compartment.

1 Claim, 2 Drawing Sheets

HARVESTING MACHINE AND SCREEN ARRANGEMENT

FIELD OF THE INVENTION

The invention concerns a harvesting machine that includes a chassis with an enclosed engine compartment at its rear in which an internal combustion engine is arranged, and includes a screen arrangement which can be positioned at the forward side of the engine compartment. The screen arrangement includes a perforated filter element through which a blower can convey air and to its rear into the engine compartment.

BACKGROUND OF THE INVENTION

In self propelled harvesting machines various components such as, for example, charge air coolers, oil coolers, and the internal combustion engine must be supplied with ambient air for the purpose of cooling. Since the surrounding air is frequently pervaded to a great extent with dust particles, screen arrangements are used that include perforated filter elements through which the surrounding air is drawn in and conducted to the aforementioned coolers. Although such screen arrangements are brought into rotation, as a rule, and are equipped with cleaning arrangements that suction or brush off particles from the surface of the filter, maintenance operations have been found useful from time to time that clean particles from the filters in order to remove remaining contaminants and in order to assure an adequate air flow through the filter. Such screen arrangements are usually fastened to an outer wall of the harvesting machine and can be pivoted about the vertical axis into a maintenance position (DE 195 47 348 A1 or WO 01/36794 A1).

In the case of other harvesting machines the screen arrangement extends on the forward side of an engine compartment that encloses the internal combustion engine and extends vertically and transverse to the forward operating direction, the air is taken in at the sides or the upper side of the walls of the harvesting machine and conducted through the screen arrangement (EP 0 481 203 A1, EP 0 667 447 A1 or DE 101 26 523 A1). Usually, in these screen arrangements there is no possibility of bringing the screen arrangements into a maintenance position without disassembly, rather the maintenance is performed by an operator stationed at the forward side of the screen arrangement at an accessible maintenance compartment within the harvesting machine. Since the space is relatively cramped, the operations at that location are found to be difficult and inconvenient.

Finally the configuration according to DE 102 28 213 A1 should be mentioned in which the intake channel can be moved in the vertical direction in order to take in the air that is charged with fewer contaminants at an elevated intake.

SUMMARY OF THE INVENTION

The purpose of the invention is seen in the need to make available a screen arrangement, located in the interior of an agricultural harvesting machine, that can be maintained without any problem.

A self propelled harvesting machine includes a chassis at whose rear side an engine compartment is arranged, that is surrounded by walls or covers or the like. A screen arrangement with a perforated filter element is arranged on the forward side of the engine compartment, that as a rule, is associated with a blower generally arranged to the rear of the screen arrangement, in order to convey air through the filter element to the screen arrangement and to the rear into the engine compartment in order to supply ambient air to coolers and other elements that must be supplied with ambient air. Accordingly, the air flow extends from the front to the rear through the filter element. The screen arrangement is movable in a direction extending horizontally and transverse to the forward operating direction of the harvesting machine between an operating position, in which it is located at the forward side of the engine compartment, and a maintenance position in which it can be slid and spaced away from the engine compartment, on the outer side of the harvesting machine and is located partially or entirely outside the outline of the enclosure of the engine compartment.

In this way, the maintenance of the screen arrangement is considerably simplified since it can be reached in the maintenance position by an operator without any problem.

The mobility of the screen arrangement can be achieved by telescopic retaining arrangements arranged on its upper and/or its lower side. Such retaining arrangements include a first carrier, rigidly connected to the chassis and a second carrier that is arranged so as to slide on the inner or the outer side of the first carrier and which retains the screen arrangement. Sliding bearings or rolling contact bearings may be arranged between the two carriers in order to improve the sliding. Furthermore, means are preferably provided in order to immobilize the second carrier or the screen arrangement in the operating position and the maintenance position.

In a preferred embodiment of the invention an interior space is provided on the forward side of the engine compartment that is enclosed to the sides and upward by walls and to the rear by the screen arrangement. One of the side walls may be interrupted by a locked door in order to provide an operator with an access to an interior space that preferably can be entered. The interior space is enclosed to the front by components of the harvesting machine (such as an outlet duct extending upward, a conveying arrangement located beneath this and/or a kernel processor) and/or a forward wall to which a rear wall of the cab can adjoin or that is formed by the latter. The accessible interior space makes it possible for the operator to store materials there and to provide access to the aforementioned components of the harvesting machine. The walls enclosing the interior space in the upward direction and optionally the side walls may be equipped with openings to which air is drawn in.

Since the screen arrangement is located at a certain height above the ground, so that its maintenance cannot be performed from the ground or only with the use of ladders or other climbing devices, an advantageous solution is to add a platform on the chassis in front of or to the side of the engine compartment, from which the operator can reach the screen arrangement located in the maintenance position. Such a platform can be formed by a console attached to the chassis or the upper side of a fuel tank projecting over the frame and the side walls of the harvesting machine.

BRIEF DESCRIPTION OF THE DRAWINGS

An embodiment of the invention will be described with reference to the accompanying drawings, wherein.

DESCRIPTION OF THE PREFERRED EMBODIMENT

Figure 1:
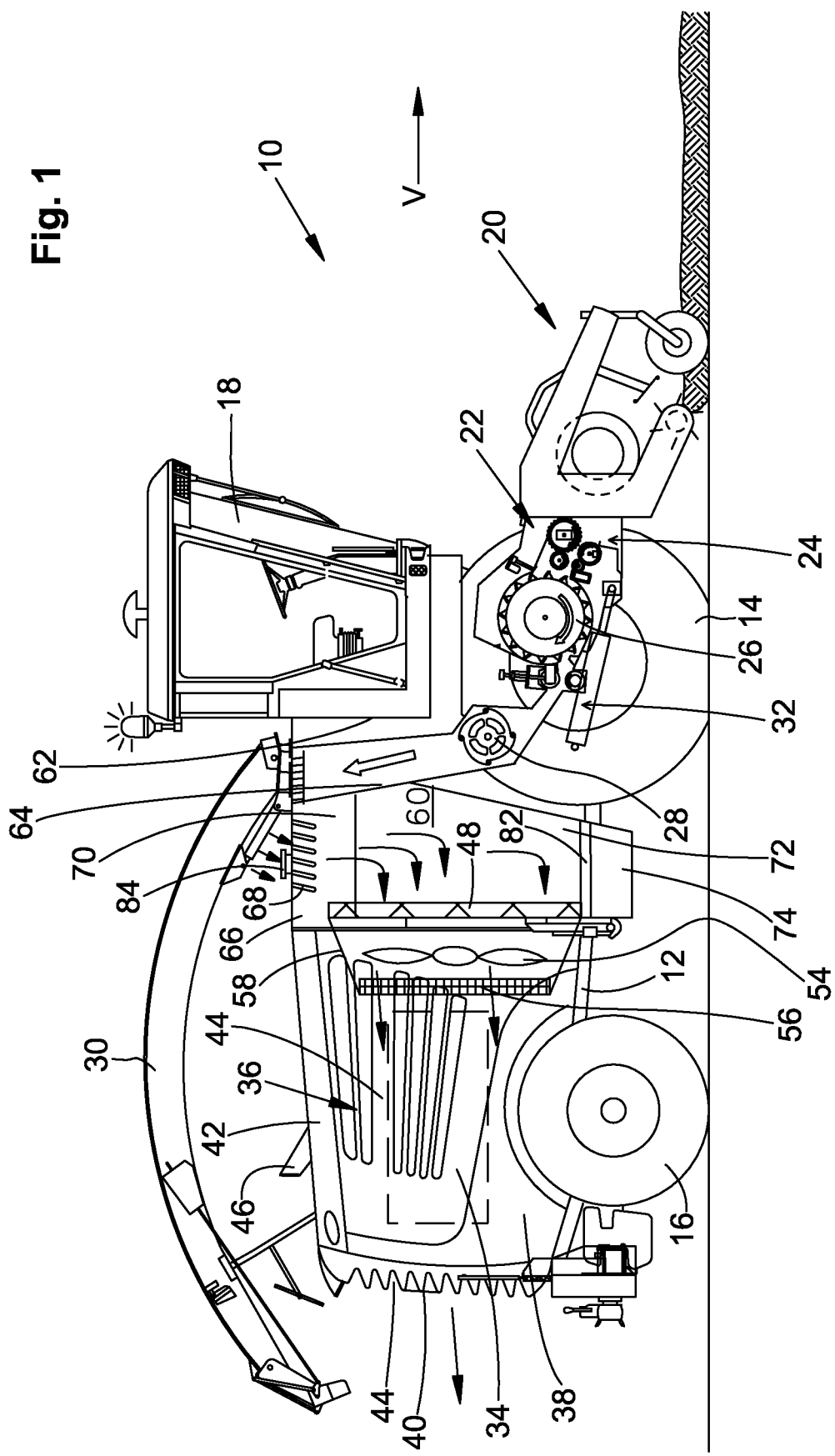
FIG. 1 is a schematic side view of a self propelled harvesting machine in the form of a forage harvester; and, FIG. 2 is a perspective view of the screen arrangement of FIG. 1 repositioned into the maintenance position.

FIG. 1 shows a schematic side view of a harvesting machine 10 in the form of a self propelled forage harvester.

The harvesting machine 10 is based on a chassis with a frame 12, that is carried by driven front wheels 14 and steerable rear wheels 16. The operation of the harvesting machine 10 is controlled from an operator's cab 18, from which a front harvesting attachment 20 in the form of a take-up arrangement can be controlled visually. Harvested crop such as grass or the like, taken up from the ground by means of the front harvesting attachment 20 is conveyed by a draw-in conveyor 22 having pre-pressing rollers which are arranged within an intake housing 24 on the front side of the forage harvester 10, to a chopper arrangement 26 in the form of a chopper drum arranged underneath the operator's cab 18, that chops it in small pieces and delivers it to a post chopper reduction arrangement 32 and a conveyor arrangement 28. The harvested crop leaves the harvesting machine 10 to an accompanying trailer over an outlet duct 30 whose upper part can be rotated about an approximately vertical axis and is adjustable in its inclination. In the following directional statements such as to the side, below, and upper refer to the forward operation direction V of the harvesting machine 10, that extends to the right in FIG. 1.

The energy supply of the drive arrangement that drives the front harvesting attachment 20, the intake conveyor 24, the post chopper reduction arrangement 32 and the conveying arrangement 28 as well as further driven elements and actuators of the harvesting machine 10 is provided by an internal combustion engine 34 (over mechanical, hydraulic and/or electrical drive lines) that is arranged above the rear wheels 16 within an engine compartment 36. The engine compartment 36 is enclosed on both sides by side walls 38, towards the rear by a rear wall 40 and upwards by a roof 42. The walls 38, 40 and the roof 42 do not, as a rule, have any support function, but are used only to enclose the internal combustion engine 34 to the outside and are attached to supporting struts (not shown) that are attached to the frame 12. The walls 38, 40 and possibly, but not necessarily the roof 42 are equipped with slotted openings 44 through which air can escape. An exhaust 46 of the internal combustion engine 34 extends also through the roof 42 through an opening.

The engine compartment 36 is enclosed to the front by a screen arrangement 48, that includes a circular, perforated filter element 50 (see FIG. 2) that can be brought into rotation about a central axis 52 by a drive extending horizontally and in a forward operating direction V. In addition, the filter arrangement 50 is associated with a cleaning arrangement that removes contaminants from the front and rear sides of the filter arrangements 50 (not shown, but see EP 1 134 379 A2, whose disclosure is incorporated into the present document by reference). A driven blower 54 is located to the rear of the screen arrangement 48, and rotates about an axis of rotation extending coaxially to the central axis 52. To the rear of the blower 54 there are various coolers 56 which among others, include an oil cooler of the internal combustion engine 34, a charge air cooler, a hydraulic oil cooler, and an evaporator for an air conditioning arrangement for the operator's cab 18. It would be possible to exchange the positions of the blower 54 and the coolers 56. The screen arrangement 48, the blower 54, and the cooler 56 are enclosed upward and to the sides by a housing 58 in order to concentrate the air flow. After passing the cooler 56 the air flow continues over the internal combustion engine and then reaches outward through the opening 44. For that matter it would also be conceivable to equip the harvesting machine with two or more internal combustion engines 34 and associated coolers 56.

An accessible interior space 60 is formed at the front side of the screen arrangement 48, that is enclosed to the front by a wall 62 located behind the rear wall of the operator's cab 18, the rear wall 64 of the fixed lower part of the outlet duct 30 and the housing of the conveyor arrangement 28. In the upper direction the interior space 60 is enclosed by a roof 66 equipped with air inlet slots 68. During operation the blower 54 draws in ambient air through the air inlet slots 68. Finally the interior space 60 is enclosed to the side by walls 70, into which a door 72 is provided. A fuel tank 74 is located at the lower side of the interior space 60 that extends to the outside over the walls 70 and the frame 12 and that can be refilled through a spigot 84.

Figure 2:
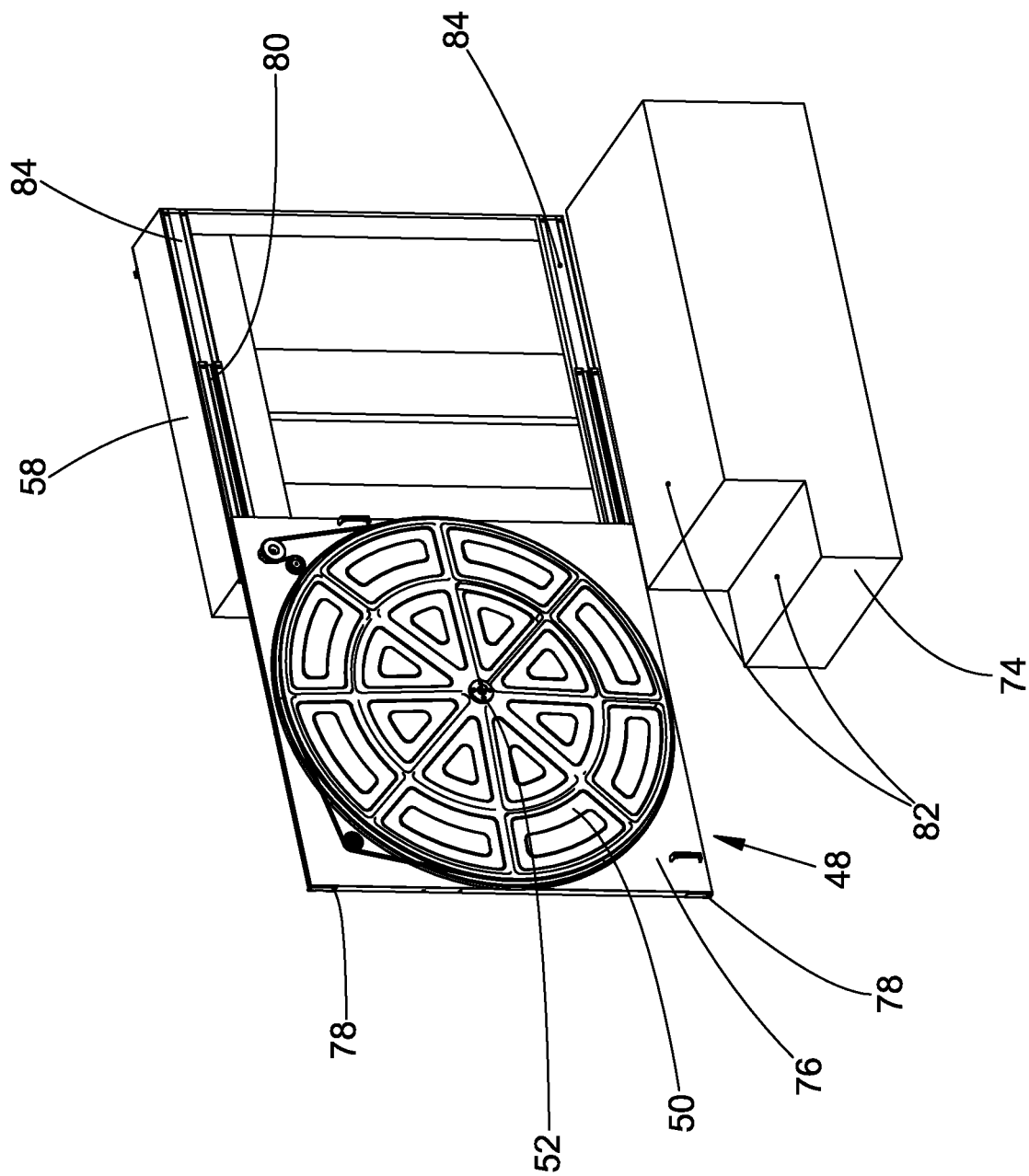

Reference is now made to FIG. 2, on the basis of which it can be seen that the screen arrangement 48 is attached to the frame 12 so that it can be slid to the side, and can be moved between an operating position shown in FIG. 1 and a maintenance position shown in FIG. 2. For this purpose the screen arrangement 48 includes a square plate 76 with a central, circular opening in which the filter element 50 is arranged. The plate 76 is connected to hollow carriers 78 on its upper and lower sides that extend horizontally and transverse to the forward operating direction V, which carriers 78 in turn enclose coaxial carriers 80 within their interior spaces, which for their part are supported in bearings in carriers 84, so as to telescope, which carriers 84 are rigidly connected to the frame 12. Rolling contacts or sliding bearings (not shown) may be arranged between the carrier 80 and the telescoping hollow carrier 78 (and between carriers 80 and 84) in order to reduce friction. If the sliding path provided by each of the two sliding carriers 78, 80 is insufficient, third sliding carriers (not shown) can be provided in between.

The sliding arrangement of the screen arrangement 48 permits the operator to enter the interior space 60 after opening the door 72, to open if necessary a locking arrangement of the screen arrangement and then to slide the screen arrangement 48 into the maintenance position according to FIG. 2, in which the screen arrangement 48 is located outside the interior space 60. Then the operator can stand on the platform, preferably with two steps, formed by the upper side of the fuel tank 74 and clean the filter arrangement 50 of the screen arrangement 48, for example, with compressed air, or perform other operations on it. In addition, the operator has access from the interior 60 to the blower 54 and can perform operations on the conveyor arrangement 28 or install or disassemble the post chopper reduction arrangement 32. Subsequently the screen arrangement 48 is again brought into the operating position and the door 72 is closed so that the harvesting operation or the operation on public roads can be continued.

Having described the preferred embodiment, it will become apparent that various modifications can be made without departing from the scope of the invention as defined in the accompanying claims.

The invention claimed is:

1. A harvesting machine, comprising:
  a chassis, having an enclosed engine compartment in which an internal combustion engine is arranged; and,
  a screen arrangement that can be positioned on the forward side of the engine compartment, through which a blower can convey air through it and to the rear into the engine compartment;
  wherein the screen arrangement is arranged so that it can be slid in a direction extending horizontally and transverse to the forward operating direction of the harvesting machine between an operating position at the forward side of the engine compartment and a maintenance position spaced away from the engine compartment and the screen arrangement is fastened to telescoping carriers at at least one of: its upper and its lower side.

* * * * *